United States Patent

Furuya

[11] Patent Number: 6,034,327
[45] Date of Patent: Mar. 7, 2000

[54] GROMMET AND STRUCTURE FOR TAKING OUT ELECTRIC POWER FROM ELECTRIC CONNECTION BOX BY USING GROMMET

[75] Inventor: Yoshinobu Furuya, Shizuoka-ken, Japan

[73] Assignee: Yazaki Corporation, Tokyo, Japan

[21] Appl. No.: 09/035,925

[22] Filed: Mar. 6, 1998

[30] Foreign Application Priority Data

Mar. 10, 1997 [JP] Japan ................................. 9-055057

[51] Int. Cl.[7] ................................................ H02G 3/18
[52] U.S. Cl. ................................ 174/65 G; 174/152 G
[58] Field of Search ................................ 174/65 G, 152 G, 174/153 G, 151, 135; 248/56; 16/2.1, 2.2

[56] References Cited

U.S. PATENT DOCUMENTS

| 1,697,814 | 1/1929 | Forbes | 174/152 G X |
|---|---|---|---|
| 1,800,578 | 4/1931 | Webb | 174/65 G |
| 2,006,931 | 7/1935 | Powers | 174/152 G X |
| 2,115,495 | 4/1938 | Mapelsden | 174/152 G X |
| 2,223,153 | 11/1940 | Seifer | 174/152 G X |
| 2,517,717 | 8/1950 | Rose | 174/152 G X |
| 3,206,539 | 9/1965 | Kelly | 174/65 G X |
| 3,229,026 | 1/1966 | Sulzer | 174/65 G |
| 3,499,097 | 3/1970 | Widstrand | 174/65 G |
| 3,510,628 | 5/1970 | Zahaykevich | 174/65 G X |
| 4,272,645 | 6/1981 | Kornatowski | 174/65 G |
| 4,822,951 | 4/1989 | Wilson et al. | 174/153 G X |
| 5,422,436 | 6/1995 | Zachrai | 174/152 G X |

FOREIGN PATENT DOCUMENTS

| 63-146916 | 9/1988 | Japan . |
|---|---|---|
| 64-37090 | 3/1989 | Japan . |
| 3-127865 | 12/1991 | Japan . |
| 7-296660 | 11/1995 | Japan . |

Primary Examiner—Dean A. Reichard
Attorney, Agent, or Firm—Finnegan, Henderson, Farabow, Garrett & Dunner, L.L.P.

[57] ABSTRACT

A grommet having a mounting hole (20) extending through a wall portion (17) of an electric connection box (15) made of a conductive metal plate, a grommet (21) in which an engaging groove (24) engaging with the mounting hole (20) is formed on an outer peripheral surface of a body portion made of an elastic member having a high insulation performance and a bus bar insertion hole (23) is formed in the body portion (22) so as to be mounted to the electric connection box (15) by engaging the engaging groove (24) with the mounting hole (20), and a connection bus bar (18) extending through the bus bar insertion hole (23) so as to be held by the grommet (21) and connected to a circuit end bus bar disposed within the electric connection box (15).

17 Claims, 3 Drawing Sheets

6,034,327

GROMMET AND STRUCTURE FOR TAKING OUT ELECTRIC POWER FROM ELECTRIC CONNECTION BOX BY USING GROMMET

BACKGROUND OF THE INVENTION

1. Field of the Invention

The present invention relates to a grommet attached to an electric connection box made of a conductive metal plate such as an iron plate, a stainless plate and the like, and a structure for taking out an electric power from an electric connection box by using the grommet.

2. Description of the Related Art

In a structure for taking out an electric power from an electric connection box in accordance with the related art, a wall portion thereof is made of a conductive metal plate such as an iron plate, a stainless plate and the like.

In the structure, a mounting hole is formed on the wall portion of the electric connection box and a grommet made of an insulating material is fitted into the mounting hole. A coated electric wire is inserted into the grommet and a screwing terminal is connected to an end portion of an outer side of the electric connection box in the coated electric wire. An end portion of the coated electric wire close to the inner portion of the electric connection box is connected to a bus bar disposed within the electric connection box, so that an electric power can be taken out by connecting a terminal portion of the screwing terminal to the other electric wire by means of screwing.

In a structure in accordance with another related art, a connector is attached to the wall portion of the electric connection box. The terminal portion is drawn out within the electric connection box from the connector, and the terminal portion is disposed within the electric connection box so as to be connected to the bus bar constituting a branch circuit by means of a bolt, so that the electric power is taken out.

In order to extend an electric wire through a vehicle body panel by using a grommet, in a structure described in Japanese Patent Unexamined Application Laid Open No. 7-296660, the grommet is formed as a trumpet shape by using an insulating material and a fitting groove is formed on an outer peripheral surface thereof. In a state that the electric wire is extended through the grommet, the grommet is pressed into a through hole of the panel and the fitting groove is fitted into the through hole, so that the electric wire is disposed in such a manner as to extend through the panel.

In the former structure, it is necessary to support a connection portion between the terminal portion of the screwing terminal and the other electric wire by a holder, however, there is a problem that it is difficult to dispose the holder in a narrow vehicle inner space. Further, it is difficult to bend the electric wire within the narrow space and a degree of freedom for disposing the electric wire is limited. In the latter structure, the matter is the same as that of the former structure, that is, since the connector itself is large, it is difficult to dispose the connector within the narrow vehicle inner space. Further, in the structure described in Japanese Patent Unexamined Application Laid Open No. 7-296660, since the grommet is used, there are the same problems as those mentioned above.

Further, in the conventional three structures mentioned above, since the electric power is taken out by using the electric wire or the connector and the connection to the bus bar within the electric connection box is performed, an end treatment with respect to these elements is required, so that the operation is troublesome.

Taking the above matter into consideration, it is considered that in order to form the branch circuit, the bus bar disposed within the electric connection box is drawn out from the electric connection box so as to take out the electric power. However, in this case, it is necessary to secure an insulation between the bus bar and the electric connection box. In order to achieve this, it is necessary to provide an insulation distance equal to or more than 15 mm between the elements, and it is not practical to secure such a long insulation distance within the narrow space.

SUMMARY OF THE INVENTION

The present invention has been achieved with such points in view.

It therefore is an object of the present invention to provide a grommet for taking out an electric power with using a bus bar which is the same as a bus bar within an electric connection box, without using an electric wire and a connector, and a structure for taking out an electric power by using the grommet.

To achieve the object, according to a first aspect of the present invention, there is provided a grommet comprising: a body portion made of an elastic member with a high insulation performance having an engaging groove formed on an outer peripheral surface thereof, the engaging groove engaging with a mounting hole extending through a wall portion of an electric connection box made of a conductive metal plate; and a bus bar insertion hole formed in the body portion and in which a connection bus bar inserted into the electric connection box is held in an insertion state.

In the grommet in accordance with the first aspect of the present invention, the grommet is attached to the electric connection box by engaging the engaging groove with the mounting hole of the wall portion in the electric connection box. The connection bus bar is held in the grommet by inserting the connection bus bar through the bus bar insertion hole on the grommet. The connection bus bar is positioned by this hold. Further, in a held state, since the grommet is made of an elastic member having a high insulation performance, even when a distance between the connection bus bar and the wall portion of the electric connection box is short, an insulation can be certainly secured, thereby being disposed within a narrow space. Accordingly, an end portion of the connection bus bar entered into the electric connection box and a circuit end bus bar disposed within the connection box can be connected to each other.

According to a second aspect of the present invention, as it depends from the first aspect, the body portion is formed with a grip portion to grip the wall portion of the electric connection box from both sides when the engaging groove engages with the mounting hole.

In accordance with the second aspect, since the grip portion formed in the body portion grips the wall portion of the electric connection box, the grommet can be firmly attached to the electric connection box, so that the grommet is not got out of place from the electric connection box at a time of insertion and removal of the connection bus bar.

According to a third aspect of the present invention, there is provided a structure for taking out an electric power from an electric connection box by using a grommet, comprising: a mounting hole extending through a wall portion of an electric connection box made of a conductive metal plate; a grommet in which an engaging groove engaging with the mounting hole is formed on an outer peripheral surface of a body portion of the grommet made of an elastic member with a high insulation performance, the grommet formed with a bus bar insertion hole on the body portion, and the grommet being mounted to the electric connection box by engaging the engaging groove with the mounting hole; and a connection bus bar extending through the bus bar insertion hole so as to be held by the grommet and connected to a circuit bus bar disposed within the electric connection box.

In accordance with the third aspect, since the grommet is pressed into the mounting hole from the outer side of the electric connection box so as to engage the engaging groove, the grommet can be attached to the electric connection box. Since the connection bus bar is inserted into the grommet from the outer side of the electric connection box, the connection bus bar is insulated by the grommet and is mounted in a state of being held. In this mounting state, even when the distance between the connection bus bar and the electric connection box is short, the insulation can be secured by a high insulation performance of the grommet. Then, the electric power from the circuit end bus bar is supplied to the connection bus bar by connecting the connection bus bar to the circuit end bus bar disposed within the electric connection box. Accordingly, the electric power can be taken out by using the same bus bar as the bus bar disposed within the electric connection box.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
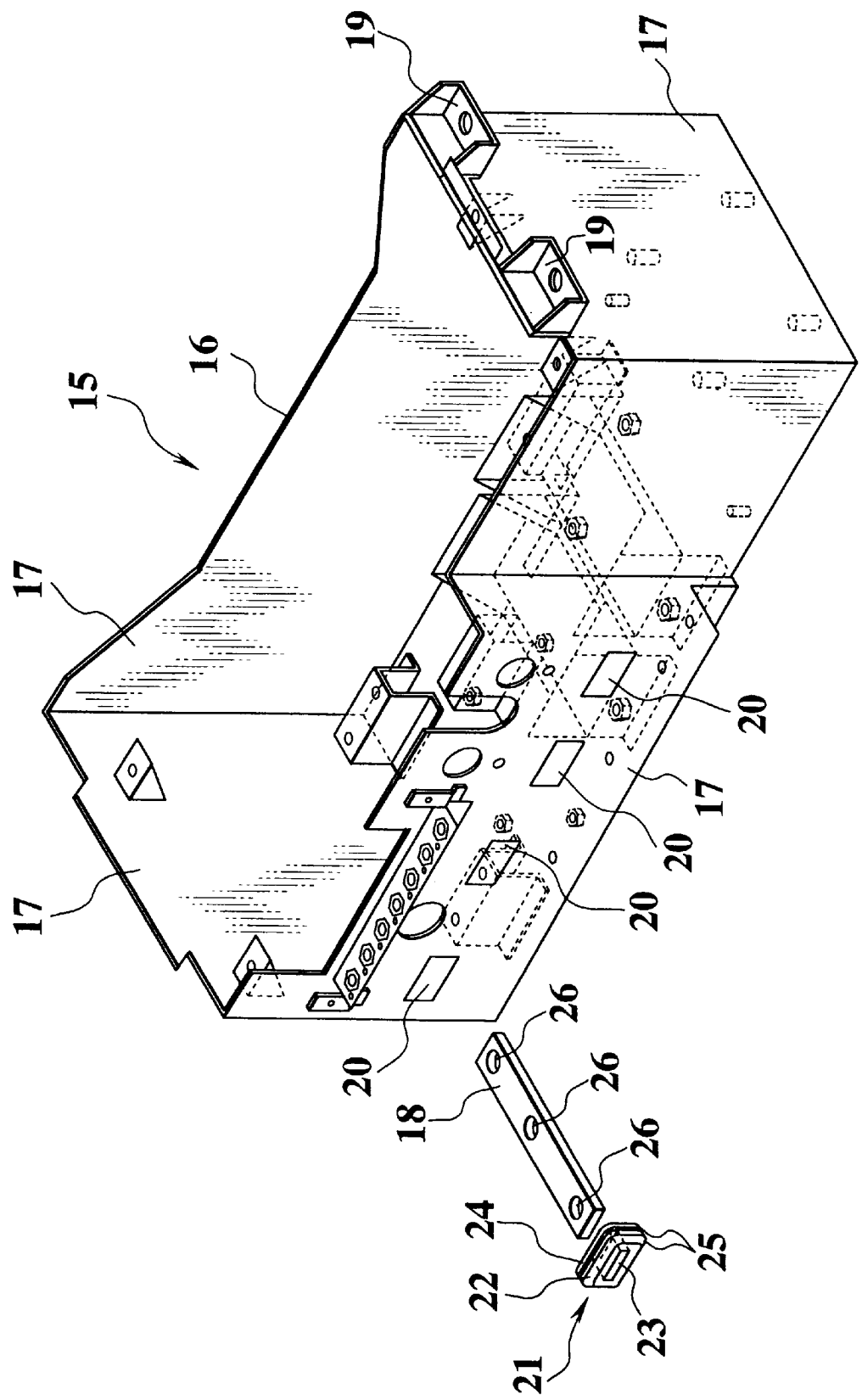
FIG. 1 is an exploded perspective view which shows an embodiment of in accordance with the present invention.

There will be detailed below the preferred embodiments of the present invention with reference to the accompanying drawings. Like members are designated by like reference characters.

FIG. 1 is an exploded perspective view which shows an embodiment of a structure for taking out an electric power in accordance with the present invention, in which reference numeral 15 denotes an electric connection box mounted on an automotive vehicle and distributing an electric power. The electric connection box 15 is constituted by a connection box body 16 and a cover (not shown) mounted in such a manner as to cover the connection box body 16.

The connection box body 16 is formed as a box shape in which four peripheral surfaces are surrounded by a wall portion 17, and a plurality of circuit end bus bars (not shown) constituting a branch circuit for distributing an electric power are disposed within the connection box body 16. The circuit end bus bar is formed by a flat conductive metal plate as in the same manner as that of a connection bus bar 18 mentioned below. Further, the wall portion 17 is formed by a conductive metal plate such as an iron plate, a stainless plate and the like having a strength. A bracket 19 is mounted to an outer surface of the wall portion 17 of the connection box body 16 and the connection box body is mounted to a vehicle body panel through the bracket 19.

A plurality of mounting holes 20 extend through one or a plurality of wall portions 17 in the connection box body 16. The mounting hole 20 is substantially rectangular shape. The mounting hole 20 is formed in a portion in which the electric power is taken out in such a manner as to extend therethrough, and the circuit end bus bar is disposed in a portion opposing to the mounting hole 20 in an inner portion of the connection box 16 in such a manner as to be in a close relation. A grommet 21 is mounted to the mounting hole 20.

Figure 2:
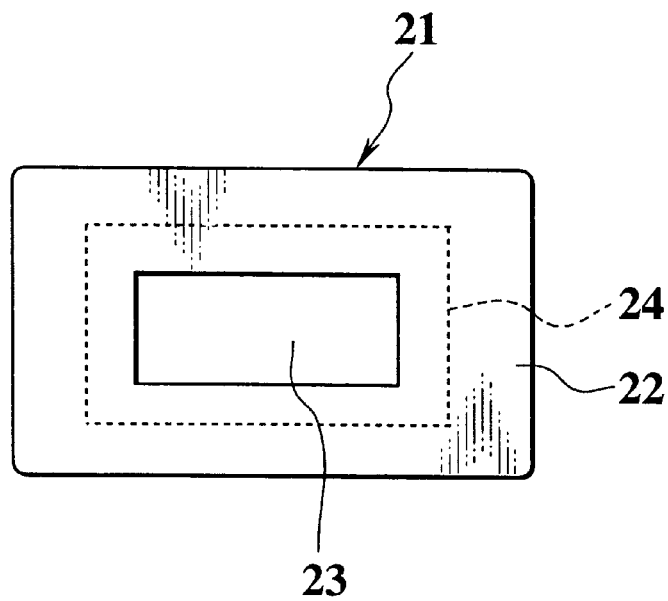
FIG. 2 is a front elevational view of a grommet.
Figure 3:
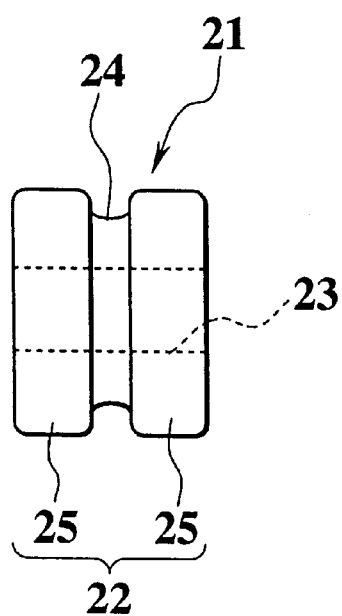
FIG. 3 is a side elevational view of the grommet.

FIGS. 2 and 3 respectively show a front elevational view and a side elevational view of the grommet 21. The grommet 21 is provided with a body portion 22 formed as an outer shape fitted into the mounting hole 20 and a bus bar insertion hole 23 extending through a substantially center portion of the body portion 22 to a thickness direction. The grommet 21 and the bus bar insertion hole 23 are substantially rectangular shape, respectively. The body portion 22 is wholly formed by an elastic member having a high insulation performance and having an insulation resistance value at a degree equal to or more than $10^7$ to $10^8$ mΩ. Because of such a high insulation performance, the insulation between the connection bus bar 18 and the wall portion 17 of the connection box body 16 can be certainly secured.

An engaging groove 24 is formed on the outer peripheral surface of the body portion 22 of the grommet 21. The engaging groove 24 is structured in such a manner as to engage with the mounting hole 20 formed in the connection box body 16, and the grommet 21 is attached to the connection box body 16 by this engagement.

Figure 4:
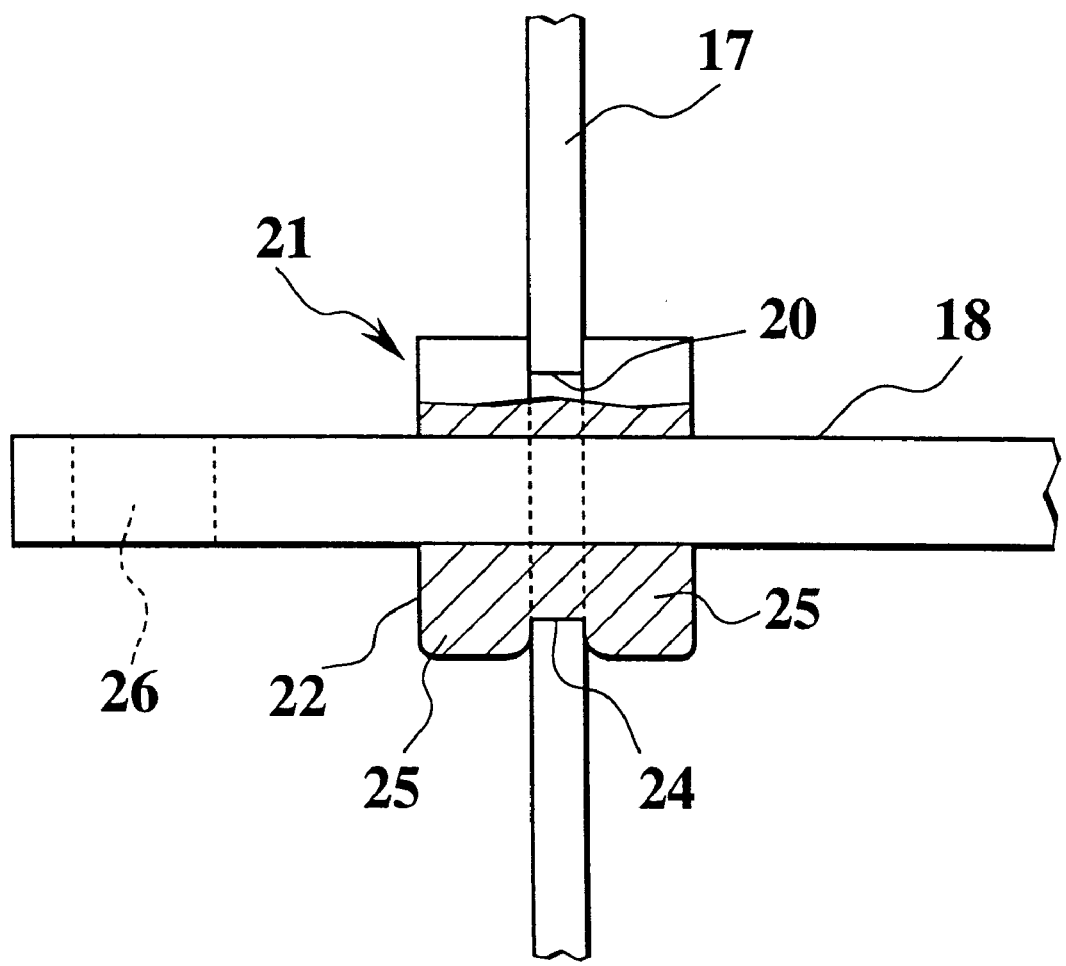
FIG. 4 is a side elevational view showing a state in which a connection bus bar is inserted into the grommet.

Grip portions 25 and 25 formed higher than the engaging groove 24 are formed on both sides of the engaging groove 24 in the outer surface of the body portion 22. The grip portions 25 and 25 are structured in such a manner as to grip the wall portion 17 of the connection box body 16 from the both sides when the engaging groove 24 engages with the mounting hole 20 as shown in FIG. 4, a mounting strength of the grommet 21 with respect to the connection box body 16 is increased by this gripping, so that even when the connection bus bar 18 is inserted into or pulled out from the grommet 21, the grommet 21 does not come off from the connection box body 16, thereby obtaining a stable mounting state.

The bus bar insertion hole 23 is structured such that the connection bus bar 18 is inserted thereinto, and that the inner surface of the bus bar insertion hole 23 is closely attached to the connection bus bar 18 due to the elasticity. Because of this close attachment, the connection bus bar 18 is positioned and fixed.

The connection bus bar 18 is wholly formed by a conductive metal, and as shown in FIG. 1, is formed as a horizontally long and flat shape. A plurality of connection holes 26 extend through the connection bus bar 18 to the thickness direction. The connection bus bar 18 is structured in such a manner as to extend through the grommet 21 and be inserted into the connection box body 16, so that due to this insertion, the connection hole 26 disposed within the connection box body 16 is connected to the circuit end bus bar disposed within the connection box body 16 by means of a bolt and the like. On the contrary, an electric wire and a connector are connected to the connection hole 26 disposed in the outer side of the connection box body 16.

An assembly in this embodiment is performed in such a manner that the grommet 21 is pressed into the mounting hole 20 of the connection box body 16, as shown in FIG. 1. Due to this pressing, the engaging groove 24 engages with the mounting hole 20 and the grip portion 25 grips the wall portion 17 in the periphery of the mounting hole 20, so that the grommet 21 is attached to the connection box body 16 in a fall-out prevention state.

Then, the connection bus bar 18 is inserted into the bus bar insertion hole 23 from the outer side of the grommet 21 and the front end thereof is inserted into the inner portion of the connection box body 16. Since the connection bus bar 18 is inserted into the grommet 21, the positioning and fixing is performed with respect to the connection box body, so as to be connected to the circuit end bus bar within the connection box body 16 in this state.

In a state of mounting the connection bus bar 18, the grommet 21 is positioned between the connection bus bar 18 and the connection box body 16, so that the insulation between the connection bus bar 18 and the connection box body 16 is realized by the grommet 21. Since the grommet 21 is made of a material having a high insulation performance, even when the thickness of the body 22 of the grommet 21 inserted into the portion between the connection bus bar 18 and the connection box body 16 is about 5 mm, a sufficient insulation performance can be secured.

Accordingly, even when the insulation distance between the connection bus bar 18 and the connection box body 16 is short, the insulation can be realized, so that the taking-out of the electric power due to the use of the bus bar can be securely performed within the narrow space. Therefore, it is unnecessary to take out the electric power by using the electric wire and the connector, so that the troublesome in treating the end and a size increase of the connection structure due to these elements can be solved.

In the above embodiment, although the mounting hole 20, the grommet 21 and the bus bar insertion hole 23 are substantially rectangular shape respectively, the shapes of the members are not limited to the rectangular shape. For example, oval shape, triangular shape or circular shape is also applicable, respectively.

While preferred embodiments of the present invention have been described using specific terms, such description is for illustrative purposes, and it is to be understood that changes and variations may be made without departing from the spirit or scope of the following claims.

What is claimed is:

1. A grommet structure comprising:
   a body portion made of an elastic member with a high insulation performance having an engaging groove formed on an outer peripheral surface thereof, the engaging groove engaging with a mounting hole extending through a wall portion of an electric connection box made of a conductive metal plate; and
   a bus bar insertion hole formed in the body portion and in which a connection bus bar inserted into the electric connection box is held in an insertion state.

2. The grommet structure according to claim 1, wherein the body portion is formed with a grip portion to grip the wall portion of the electric connection box from both sides when the engaging groove engages with the mounting hole.

3. The grommet structure according to claim 1, wherein the bus bar insertion hole formed in the body portion of the grommet is configured to elastically grip around the connection bus bar.

4. The grommet structure according to claim 1, wherein the engaging groove formed on the outer peripheral surface of the body portion is configured to elastically grip around a circumference of the mounting hole extending through the wall portion of the electric connection box.

5. The grommet structure according to claim 1, wherein the mounting hole of the electric connection box has at least four circumferential surfaces each elastically gripped by the engaging groove formed on the outer peripheral surface of the body portion.

6. The grommet structure according to claim 1, wherein the bus bar insertion hole formed in the body portion of the grommet has a circumference configured to elastically grip around a corresponding circumference of the connection bus bar.

7. The grommet structure according to claim 6, wherein the circumference of the bus bar insertion hole comprises at least four rectangular surfaces.

8. The grommet structure according to claim 1, wherein the engaging groove of the body portion is peripherally dimensioned to grip around a corresponding circumference of the mounting hole.

9. The grommet structure according to claim 8, wherein the bus bar insertion hole of the body portion is peripherally dimensioned to grip around a corresponding circumference of the connection bus bar.

10. A structure for taking out electric power from an electric connection box by using a grommet, comprising:
    a mounting hole extending through a wall portion of an electric connection box made of a conductive metal plate;
    a grommet in which an engaging grove engaging with the mounting hole is formed on an outer peripheral surface of a body portion of this grommet made of an elastic member with a high insulation performance, the grommet formed with a bus bar insertion hole through the body portion, and the grommet being mounted to the electric connection box by engaging the engaging groove with the mounting hole; and
    a connection bus bar extending through the bus bar insertion hole so as to be held by the grommet and connected to a circuit bus bar disposed within the electric connection box.

11. The structure according to claim 10, wherein the bus bar insertion hole formed in the body portion of the grommet is configured to elastically grip around a circumference the connection bus bar.

12. The structure according to claim 10, wherein the bus bar insertion hole formed in the body portion of the grommet has a circumference configured to elastically grip around a corresponding circumference of the connection bus bar.

13. The structure according to claim 12, wherein the circumference of the bus bar insertion hole comprises at least four rectangular surfaces.

14. The structure according to claim 10, wherein the engaging groove formed on the outer peripheral surface of the body portion is configured to elastically grip around a circumference of the mounting hole extending through the wall portion of the electric connection box.

15. The structure according to claim 10, wherein the mounting hole of the electric connection box has at least four circumferential surfaces each elastically gripped by the engaging groove formed on the outer peripheral surface of the body portion.

16. The structure according to claim 10, wherein the engaging groove of the body portion of the grommet is peripherally dimensioned to grip around a corresponding circumference of the mounting hole.

17. The structure according to claim 16, wherein the bus bar insertion hole of the body portion of the grommet is peripherally dimensioned to grip around a corresponding circumference of the connection bus bar.

* * * * *

UNITED STATES PATENT AND TRADEMARK OFFICE
CERTIFICATE OF CORRECTION

PATENT NO. : 6,034,327
DATED : March 7, 2000
INVENTOR(S) : Yoshinobu FURUYA

It is certified that error appears in the above-identified patent and that said Letters Patent is hereby corrected as shown below:

Claim 10, column 6, line 25, "grove" should read --groove--.

Claim 11, column 6, line 39, after "circumference" insert --of--.

Signed and Sealed this

Seventeenth Day of April, 2001

Attest:

NICHOLAS P. GODICI

Attesting Officer  Acting Director of the United States Patent and Trademark Office